Patented Dec. 20, 1938

2,140,500

UNITED STATES PATENT OFFICE 2,140,500

PREPARATION OF ETHYL CHLORIDE

James Laurence Amos, Midland, Mich., assignor to The Dow Chemical Company, Midland, Mich., a corporation of Michigan No Drawing. Application April 16, 1937, Serial No. 137,207

3 Claims. (Cl. 260—657)

The present invention relates to methods for the preparation of ethyl chloride by the hydrochlorination of ethyl ether.

My improved process for the hydrochlorination of ethyl ether comprises passing ethyl ether and hydrogen chloride, in the ratio of about two moles of hydrogen chloride per mole of ether, preferably in the vapor phase, into intimate contact with a bath of molten metal chlorides maintained at a temperature above about 125° C. but below the decomposition point of ethyl chloride. The preferred operating temperature is in the range between about 150° C. and about 375° C. An excess of hydrogen chloride may be used. The ethyl ether and hydrogen chloride may be pre-heated separately, or in admixture, to any temperature up to about 125° C. before they are passed into the molten salt bath.

The bath in which the reaction is carried out comprises suitable mixtures of the chlorides of aluminum, potassium, iron, sodium, bismuth, zinc, and other metals, such mixtures of chlorides being freely fluid at the reaction temperature. Preferably, aluminum chloride is a constituent of the molten bath. The eutectic produced by mixing 60 parts by weight of aluminum chloride, 30 parts by weight of sodium chloride, and 10 parts by weight of ferric chloride is suitable. This eutectic has a melting point of about 150° C. and a boiling point above 1000° C. A mixture of 30 parts by weight of sodium chloride and 70 parts by weight of aluminum chloride, melting at about 155° C., is equally suitable, as is also the eutectic of 64 parts of aluminum chloride and 36 parts of potassium chloride, melting at 260° C. The reaction here involved is exothermic in character, and is capable of developing enough heat to maintain the salt bath at temperatures in the range above given under ordinary conditions. In fact, cooling may be necessary when high rates of flow of reactants are employed.

The following example illustrates the practice of my invention: The bath employed was composed of 60 parts by weight of aluminum chloride, 30 parts by weight of sodium chloride, and 10 parts by weight of ferric chloride. It was approximately 5 inches in depth and weighed about two pounds. A mixture of ethyl ether and hydrogen chloride, in the ratio of approximately two moles of the chloride per mole of the ether, at a temperature of 60° C., was continuously led into the bottom of said bath at a substantially uniform rate of about 6000 cubic centimeters per hour, the bath being maintained at a temperature of about 200° C.

The gaseous reaction product was cooled to a temperature of —40° C., and the condensate collected at a rate of 9.5 milliliters per hour. The reaction product was found to contain 87 per cent by weight of ethyl chloride, which represents a yield of 83 per cent of theoretical based on the ethyl ether passed into the reaction bath.

By operating in a molten chloride bath at a temperature of approximately 325° C., in the manner described in the above example, results similar to those shown in said example can be obtained.

Other modes of applying the principle of my invention may be employed instead of the one explained, change being made as regards the method herein disclosed, provided the step or steps stated by any of the following claims or the equivalent of such stated step or steps be employed.

I, therefore, particularly point out and distinctly claim as my invention:

1. The process for the preparation of ethyl chloride which comprises passing ethyl ether and hydrogen chloride into contact with a bath of molten metal chlorides which are at a temperature in the range between about 125° C. and the decomposition point of ethyl chloride.

2. The process for the preparation of ethyl chloride which comprises passing ethyl ether and hydrogen chloride, in substantially equimolecular proportions, into contact with a bath of molten metal chlorides which are at a temperature in the range between about 125° C. and the decomposition point of ethyl chloride.

3. The process for the preparation of ethyl chloride which comprises passing ethyl ether and hydrogen chloride into contact with a bath of molten metal chlorides which are at a temperature in the range between about 125° and about 375° C.

JAMES LAURENCE AMOS.